Patented May 22, 1934

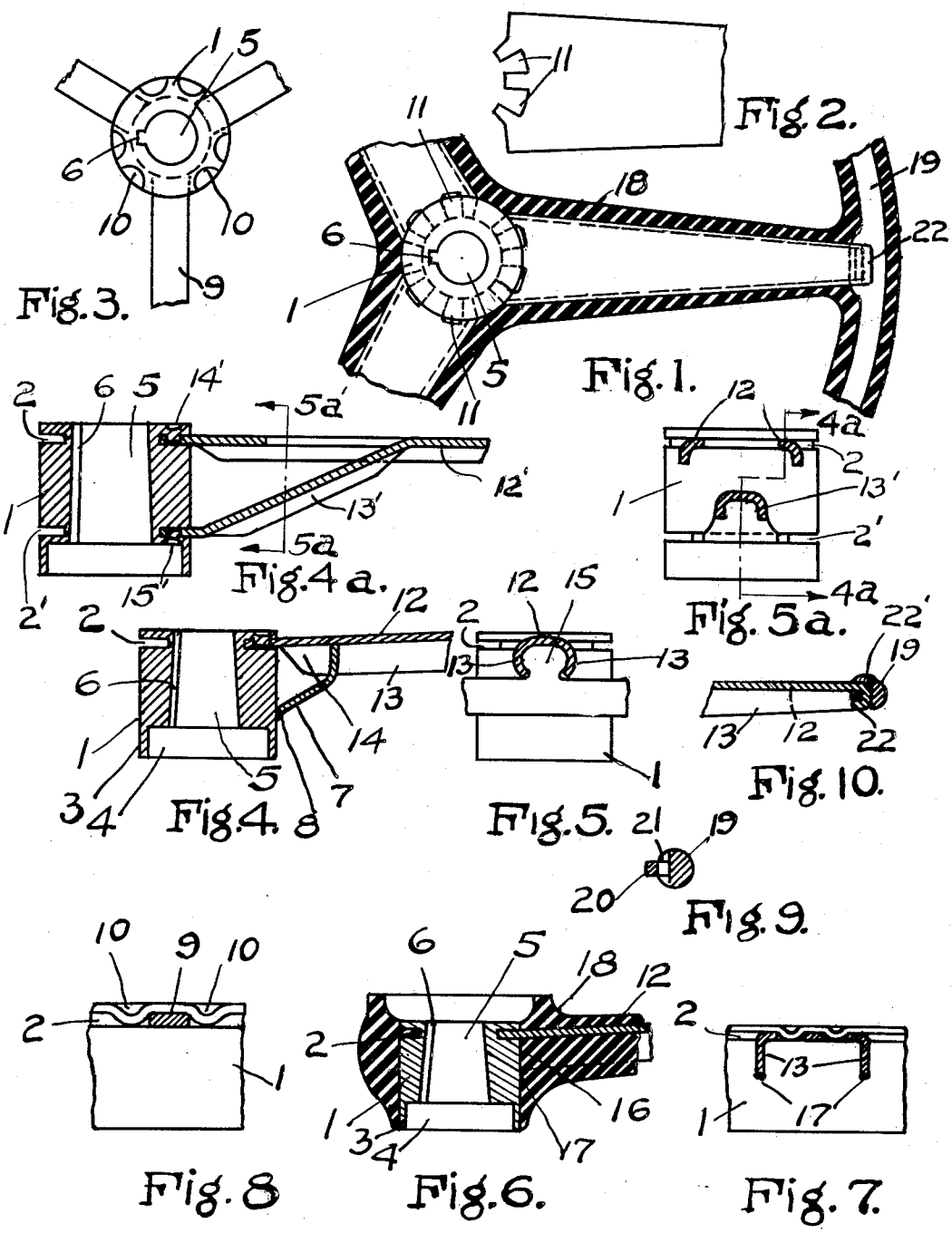

1,959,683

UNITED STATES PATENT OFFICE 1,959,683

STEERING WHEEL STRUCTURE

Courtney N. Mitchell, Cleveland Heights, Ohio, assignor to The J. & M. Machine Company, Cleveland, Ohio, a corporation of Ohio Application September 17, 1930, Serial No. 482,540

1 Claim. (Cl. 74—33)

This invention, relating as indicated to steering wheels, has specific reference to the construction of the metallic framework of a steering wheel such as is usually mounted on the end of the steering column and by which the guiding wheels of the vehicle are controlled. It will be noted that the usual practice in steering wheel construction is to provide a so-called metal insert which forms the stress bearing portion of the wheel which is coated or embedded in rubber, or like material, to enhance the appearance of the wheel. The structure comprising my invention and certain modifications thereof, is adapted to be employed in the above manner; that is, to be embedded in rubber, or like material, although it will be noted from a description of certain forms and modifications that the embedding of the steel form in the rubber is not essential and that a well-appearing wheel will result without the added expense of such rubber.

Considerable difficulty has been experienced in the past in providing a steering wheel which is light in weight, low in cost of manufacture, and yet of sufficient rigidity and strength to withstand the stresses and strains to which such wheels are subjected during use. It is among the objects of my invention to provide a steering wheel construction which shall be capable of manufacture at a relatively low cost and which has the further advantage in that the strength thereof is considerably greater than in structures heretofore employed. Other objects of my invention will appear as the description proceeds. To the accomplishment of the foregoing and related ends, said invention, then, consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 11:
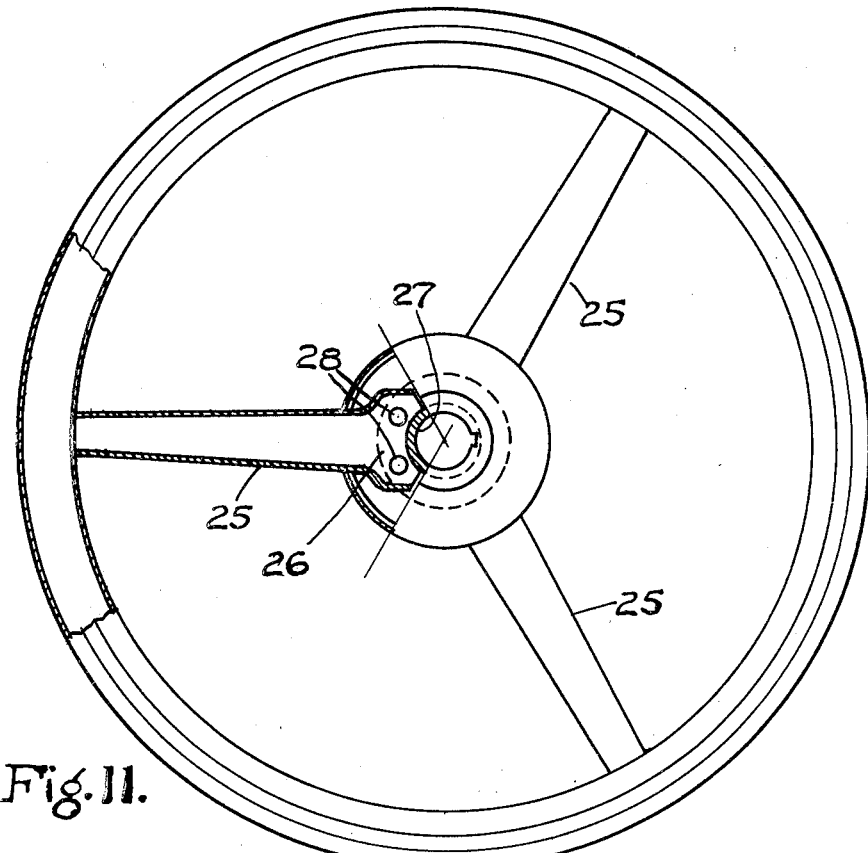
Figure 12:
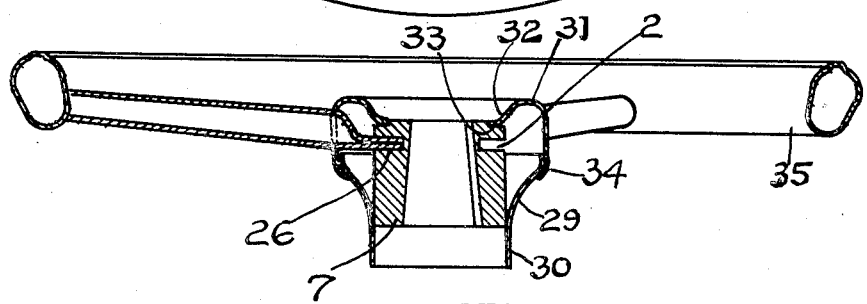
Figure 13:
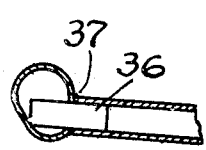

In said annexed drawings:

Fig. 1 is a fragmentary plan view of a portion of a steering wheel constructed in accordance with the principle comprising my invention; Fig. 2 is a fragmentary part sectional, part elevational view of the structure illustrated in Fig. 1; Fig. 3 is a fragmentary plan view of an alternative form of steering wheel construction analogous to that illustrated in Fig. 1; Fig. 4 is a sectional view of the hub and inner spoke ends of one form of wheel construction; Fig. 5 is a fragmentary side elevational view of the spoke and hub illustrated in Fig. 4; Fig. 4a is a fragmentary sectional view of an alternative form of hub and spoke connection; Fig. 5a is a part sectional, part side elevational view of the structure illustrated in Fig. 4a, taken on a plane substantially indicated by the line 5a—5a'; Fig. 6 is an alternative form of spoke and hub connection of which Fig. 7 is a part sectional, part side elevational view; Fig. 8 is a part sectional, part side elevational view of the hub and spoke end of the construction shown in Fig. 3 which is an alternative form of the construction illustrated in Fig. 7; Fig. 9 is a transverse sectional view through one side of the ring member of the steering wheel showing an inwardly projecting lug to which the outer end of the spoke is connected, as most clearly illustrated in Fig. 10; Fig. 11 is a part sectional, part plan view of an alternative form of wheel construction of which Fig. 12 is a transverse sectional view; and Fig. 13 is a fragmentary sectional view of an alternative form of connection between the outer spoke end and the ring member.

Referring more specifically to the drawings, and more especially to Figs. 1 to 10, inclusive, the steering wheel construction illustrated in these figures embodies a hub 1, which may be a screw machine product and which has a peripheral groove 2. The hub 1 has an axially extending flange 3 on one end, which flange may be formed by providing a relatively large aperture 4 extending coaxially into said hub, or by providing such hub with an annular axially extending sleeve in the manner hereinafter more fully described. In continuation of the aperture 4 and coaxially with respect to the hub 1 is a tapered aperture 5 adapted to engage the supplemental tapered end of the steering column, the wall of such aperture being provided with a longitudinally extending keyway slot 6, which engages a key extending laterally of the steering column so that relative rotation of the hub and the column will be prevented.

The hub 1 has a cup-shaped annular member 7 secured thereto by welding as at 8 which annular member extends laterally from the hub to serve as a means of securing a support for the spokes of the wheel in the manner hereinafter more fully explained. The spokes of the wheel which extend from the hub to the ring member may be of various forms such as are illustrated in Figs. 1 to 13, inclusive. The simplest form of spoke construction is that illustrated in Figs. 3 and 8. The spoke 9 consists of a suitable cross-section of any desired form, but which has its terminal portion flattened so as to be received by the peripheral groove 2 on the hub 1, and when so inserted in said groove, the spoke end may be secured therein by forcing together as at 10 the walls of the groove. It will be noted that instead of forcing together the walls of the groove to retain the spoke end therein, material from another source, such as a separate wire, or the like, might be forced into such groove so as to accomplish the same result. Regardless of the contour of the body of the spoke it will be noted that its inner end may be forced together to a width equal to the distance between the walls of the groove, and such spoke end thus inserted in such groove may be secured therein in the above described manner.

In Figs. 1 and 2 as shown, spoke 1 has its inner end provided with radially converging apertures which, when such spoke end is inserted in the peripheral groove of the hub and the walls of the groove forced together in such apertures, the spoke will have an interlocking relation with the hub which will materially assist in producing a rigid connection between the spoke and the hub. It will be noted that the aperture 11 may be of any form, the dove-tail arrangement thereof being preferable for the reasons above explained. Also, the inner end of the spoke may be arcuate in form so as to more clearly engage the inner periphery of the groove in which said end is positioned. As illustrated in Figs. 1 to 7, inclusive, the spoke is in the form of a channel having a web 12 and downwardly projecting legs 13.

Legs 13 may be cut away from the end of the spoke as at 14, so as to permit the projecting web 12 to be inserted in the groove 2 in the manner hereinbefore explained. When the spoke is in the form of a channel, or in any other like form, the connection between the spoke and the annular member 7 may be effected, as is most clearly illustrated in Fig. 5. In this form of construction the terminal of the annular member 7 is provided with a plurality of axially extending projections such as 15 which will lie intermediately of the legs 13 of the channel, the projection 15 having the portion thereof adjacent to the edge of the annular member 7 undercut so that when the legs of the channel are rebent, the same will be in interlocking relation with the projection 15, and consequently readily secured to the annular member 7. If deemed advisable, the legs 13 and/or the web 12 of the channel may be welded to either the projection 15 or the body of the annular member 7 to insure a more rigid connection.

Instead of employing an annular member, such as 7, in association with the inner spoke ends and the hub in order to insure a rigid connection therebetween, I may prefer to cut off the legs 13 of the channel so as to be presented in abutting relation with the hub, as illustrated in Fig. 6. When the terminally projecting flange 12 is properly inserted in the groove 2 with the inner spoke end formed in this manner, the terminals 16 of the legs 13 of the spokes may be welded as at 17 to the hub, thereby insuring a substantially rigid connection between the hub and spokes without the necessity of employing an annular member, such as 7. It will be understood that the hub and spoke connections may be embedded in rubber or like material, such as 18, so as to present a smooth finish and also to enhance the appearance of the finished wheel.

The outer ends of the spokes may be secured to the ring member by having such ring member 19 provided with an inwardly extending projection 20, which is provided with an axially extending aperture 21 adapted to receive the terminally projecting end 22 of the web 12 which end will be re-bent, as most clearly illustrated in Fig. 10. The connection of these elements may be strengthened by welding at 22', thereby insuring a rigid and substantial connection between the outer spoke end and the ring member 19. The ring member and the body of the spokes will also preferably be embedded in rubber, or like material, so as to produce a smooth surface and also to enhance the appearance of the wheel.

The form of hub and spoke connection illustrated in Figs. 4a and 5a provides a connection which is characterized by its strength and rigidity as well as the economy of its manufacture. In this form of construction, the hub 1 is provided with the usual annular groove 2 and, in addition thereto, a second annular groove 2'. The inner end of the spoke 12' has its intermediate portion cut and bent downwardly to provide a knee brace portion 13' which terminally projects into the annular groove 2' in the same manner as the bifurcated end of the spoke extends into the upper groove 2. These spoke ends may then be secured in their respective grooves by forcing material into such grooves as at 14' and 15'.

Referring now to Figs. 11, 12 and 13, it will be noted that in this form of construction the spokes 25, which may be substantially tubular or coniform, have their inner ends flattened as at 26 so as to be inserted in the groove 2 of the hub 7, and such end 26 may be secured in such groove in the manner hereinbefore described. It will also be noted that the inner end 27 of the spoke 25 is arcuate in form so as to properly engage the inner periphery of the groove 2. The flattened terminal 26 of the spoke may be provided with spaced apertures such as 28 into which the material may be forced either from the hub, or otherwise, so as to readily secure the spoke to such hub.

The hub 7 has secured thereto a substantially coniform annular member 29 which may be substantially cylindrical in form for a portion thereof, such as 30, which extends axially of the hub 7 and provides a sleeve adapted to telescopically engage the end of the steering column, this particular form of construction obviating the necessity of forming an aperture such as 4 in the member 1, as illustrated in Figs. 4 and 6, inasmuch as the portion 30 in Fig. 12 affords the necessary skirt or flange which is afforded by the portion 3 in the first named figure. The annular member 29 extends laterally of the hub 7 so as to provide a means of support for the spokes 25 intermediately of their inner and outer ends. The annular member 29 has another annular member 31 in association therewith, said annular members having complementary ends which, as at 34, may be united by reducing or enlarging one of the ends of such elements, and, in order to further insure the rigid assembly, the two complementary annular members 29 and 31 may be welded along their adjacent ends. The annular member 31 is provided with an inwardly directed flange 32 which is adapted to seat on an annular groove 33 provided therefor on the end of the hub 7. The annular member 31 will have circumferentially spaced slots therein so that the member 31 may be telescopically engaged by the annular member 29 after the spokes 25 have been secured to the hub. By employing members such as 29 and 31, the junction of the spokes and the hub may be appreciably strengthened and such elements serve the further purpose of forming a shell around such hub, so as to materially enhance its appearance. When such annular members are employed therefor, it is not necessary to embed the steel portion of the wheel in rubber in order to hide the unattractive hub and the spoke ends secured thereto. When this particular form of construction is employed, the metallic portion of the wheel structure may be coated with a relatively thin layer of electrolytically deposited rubber which will not only enhance the appearance of the wheel, but will also provide a non-conducting cover for the wheel and is superior to the coating of ordinary paint. In this form of construction, the ring member 35 may be formed with a cross-sectional contour such as is most clearly illustrated in Fig. 12, and which will conform to the cross-sectional contour of rings ordinarily employed which consists of united steel inserts and rubber coatings. The ring 35 will preferably be hollow in order to reduce the weight and cost thereof, as well as to facilitate the connection of the outer spoke ends therewith. The outer ends of the spokes 25 may be connected to the inner periphery of the ring 35 by bringing the two portions into juxtaposition and welding, or by providing the terminal portion of the spoke 25 with a reduced portion such as may be accomplished by a piece such as 36 inserted in the end thereof, which reduced terminal will enter the ring so that when the end of the spoke 25 is welded as at 37 a rigid structure will result.

With the wheel in assembled form as illustrated in Figs. 11 to 13, inclusive, hereinbefore indicated, it will not be necessary to encase such metal portion with rubber in order that the finished wheel will present the proper attractive appearance, but by simply painting or otherwise coating the metal, a finished product will result which is as attractive as the common form of wheel comprising a metal insert which is coated by rubber, or like material.

It is believed that a further description of the principles comprising my steering wheel construction need not be gone into for those familiar with the art; suffice it to say that numerous changes may be made in the specific embodiment of the invention herein explained without departing from the principles of this invention.

Other modes of applying the principles of my invention may be employed instead of the one explained, change being made as regards the mechanism herein disclosed, provided the means stated by the following claim or the equivalent of such stated means be employed.

I therefore particularly point out and distinctly claim as my invention:—

In a steering wheel, the combination of a hub member, a ring member, spoke members extending between said hub member and said ring member and terminally secured thereto, a peripheral channel in said hub member, flattened inner ends on said spoke members and adapted to be inserted in said channel, openings in said flattened spoke ends, and material forced into said channel at points in registry with said openings for securing said spoke ends in said channel.

COURTNEY N. MITCHELL.